Dec. 30, 1969     M. C. S. SIMPSON     3,487,266
STATIC OVERCURRENT RELAY DESIGNED TO ACCOMMODATE CURRENT
"OFFSET" OF UP TO 100% OF THE STEADY STATE LEVEL
Filed May 11, 1967

INVENTOR
Michael Charles Stephen Simpson
BY
    Misegades & Douglas
           ATTORNEYS

United States Patent Office 3,487,266
Patented Dec. 30, 1969

3,487,266
STATIC OVERCURRENT RELAY DESIGNED TO ACCOMMODATE CURRENT "OFFSET" OF UP TO 100% OF THE STEADY STATE LEVEL
Michael Charles Stephen Simpson, Stafford, England, assignor to The English Electric Company Limited, London, England, a British company
Filed May 11, 1967, Ser. No. 637,831
Claims priority, application Great Britain, May 13, 1966, 21,322/66
Int. Cl. H02h 7/00, 1/04
U.S. Cl. 317—33        5 Claims

ABSTRACT OF THE DISCLOSURE

This invention relates to an overcurrent relay capable of operating substantially instantaneously in response to overcurrents in protected equipment which exceed a predetermined magnitude, but is yet able to accommodate a current "offset" wave, such as is produced with a reactive source in response to sudden changes in the current level, of up to 100% of the steady state current level without picking-up.

---

This invention relates to overcurrent relays and is particularly concerned with the provision of a relay capable of operating substantially instantaneously in response to overcurrents above a predetermined magnitude and is yet able to accommodate a current "offset" wave, such as is produced with a reactive source in response to sudden changes in the current level, of up to 100% of the steady-state current level without picking-up.

From one aspect, the present invention consists in an overcurrent relay comprising a rectifier circuit for developing a rectified voltage proportional to the magnitude of alternating current flowing through equipment protected by said relay, and means for both instantaneously applying a proportion of said voltage to a device capable of effecting a protective function, said proportion being not greater than one half, and adding to said proportional voltage a further voltage which increases with time in dependence on the decay time constant of said current through the equipment whereby the total voltage applied to the device increases towards that obtaining in the steady state, said device being operative to effect said function upon the voltage applied thereto exceeding a predetermined level.

The said means may comprise a capacitor voltage divider connected across the rectifier circuit and a resistor connected in parallel with one part of said divider, the input to the protective device being developed across the other part of the divider and the time constant of the resistor and the or all the capacitors in the said other part of the divider being chosen to match the decay time constant of the said current through the protected equipment.

With a relay according to this invention, practically instantaneous operation can therefore be obtained with high overcurrents such as would produce a voltage across the capacitor divider two or more times greater than the said predetermined level to which the protective device is set to respond, a delay in operation being introduced for such overcurrents as would produce a smaller voltage across the voltage divider but which is yet in excess of the said predetermined level. This time delay is not a disadvantage when such comparatively small overloads are occasioned since rapid clearance is only required for high fault currents which can cause serious thermal damage in a short time and thus a relay according to this invention can be designed to operate safely under all conditions with zero "over-reach."

Figure 1:
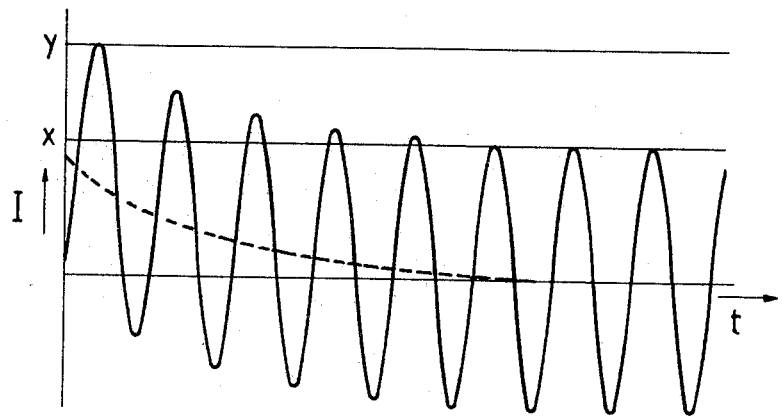
Figure 2:
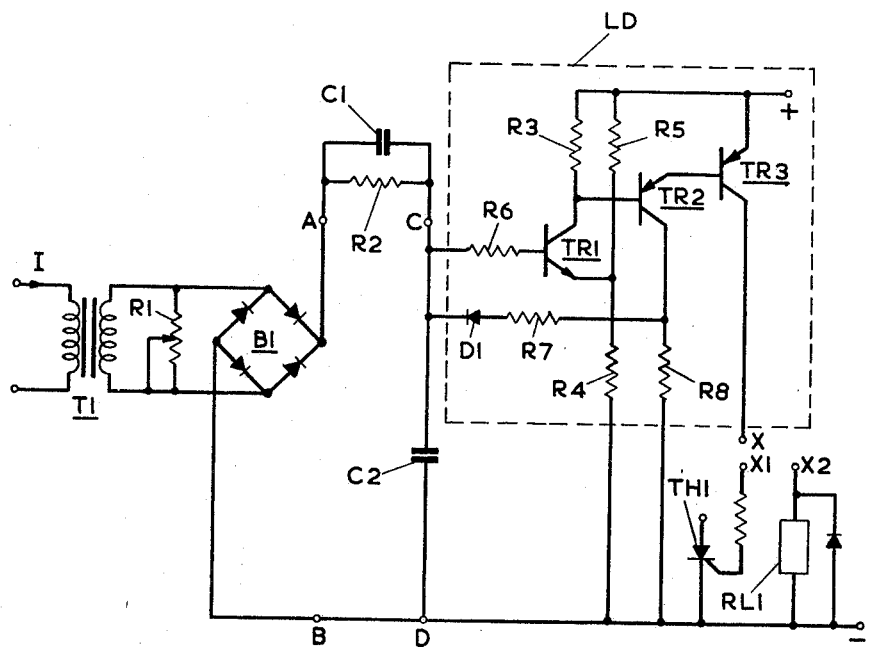

In order that the invention can be fully understood, one embodiment thereof will now be described, by way of example, with reference to the accompanying drawings, in which:

FIGURE 1 illustrates the waveform current drawn from a reactive source upon switching; and FIGURE 2 illustrates a circuit diagram of an overcurrent relay according to this invention.

Referring firstly to FIGURE 1, the waveform of current drawn from a reactive source when it is switched-on from zero level initially rises from this level by an amount which can be almost equal to its steady-state positive-negative excursions, and subsequently the mean level of current decays to zero exponentially with a time constant dependent on the reactive source, e.g. $L/R$ for an inductor having an inductance $L$ and a resistance $R$.

Accordingly, the current waveform is initially "offset" before reaching its steady-state level and, from above, it follows that its initial peak value can be almost twice its steady-state peak value.

Now, if an overcurrent relay is responsive to peak values and is set to pick-up at the level $y$ amps, then such a relay would pick-up under the above conditions although the steady-state peak current is only $x$ amps. The effect which leads to this malfunction is termed "over-reach" and is defined as $((y-x)/y) \times 100\%$.

This effect can be overcome by delaying the current measurement by the relay until the "offset" has decayed to zero but this can result in an operating delay extending over several cycles, and if this delay were independent of current level then the equipment protected by the relay could conceivably be damaged during this period.

Referring now to FIGURE 2, there is shown an overcurrent relay which is designed to overcome this drawback and operate substantially instantaneously, i.e. within a period less than that occupied by ¼ cycle for current values which are greater than twice its pick-up level, and to operate within a period proportional to the actual current value for those values which do not exceed this pick-up level. In achieving this performance, no intentional delay is introduced for currents greater than twice the pick-up level because any current wave having a peak value greater than this level is bound to have a steady-state value greater than the pick-up value since the peak value of an "offset" wave cannot exceed twice that attained in the steady-state.

The circuit shown comprises a current transformer T1 the primary winding of which receives the current passing through the protected equipment through an interposing current transformer (not shown), and the secondary winding has a variable resistor R1 connected thereto. The A.C. voltage developed across the resistor R1 is proportional to the secondary current and this is applied to a bridge rectifier R1 so that a rectified A.C. voltage, i.e. a voltage containing both A.C. and D.C. components, proportional to the primary current is developed across terminals A and B. Connected across these terminals is a resistive-capacitive network comprising a parallel-connected resistor R2 and capacitor C1 and a series-connected capacitor C2, a level detector circuit LD being connected across this capacitor C2, i.e. across terminals C and D.

In particular, this network LD comprises an n-p-n transistor TR1 having a collector load resistor R3, its emitter being connected to the junction of a potential divider R4, R5 and its base being connected to the terminal C through a resistor R6. A p-n-p transistor TR2 has its base connected to the collector of TR1, and resistors R7 and R8 connected in its collector circuit, resistor R7 providing a feedback path to TR1 through a diode D1 which is poled so as to block a discharge path for C2 through R7 and R8. This transistor TR2 drives an output stage comprising a p-n-p transistor TR3, the emitter of this transistor being connected directly to the positive supply line and its base being connected directly to the emitter of TR2, the output being taken from a terminal X connected to the collector of TR3.

In operation, the voltage developed across C2 in the resistive-capacitor network (which effectively forms an "offset" filter) comprises the instantaneous voltage derived from the capacitor divider C1, C2 together with the exponential D.C. voltage building-up through R2, C2, the values of R2, C1 and C2 being so chosen that the instantaneous voltage is equal to half that appearing across the terminals A and B and the time constant R2, C2 being chosen to match the current decay time constant of the protected equipment. For example, assuming a source angle of 80° i.e. $X/R=\tan^{-1} 80°$, then for an inductive source the time constant $L/R=(\tan^{-1} 80°)/w$ and the time constant R2, C2 should be equal to this.

Thus, the voltage appearing across C2 is delayed in reaching the reference level unless the input voltage is greater than twice this reference level, in which case there is no intentional delay.

The reference level itself is set at the emitter of transistor TR1 by the potential divider R4, R5, and when the potential across C2 is greater than this reference level TR1 conducts and its collector current is drawn through the base of TR2 so that this latter transistor is also caused to conduct. The collector current of TR2 develops a voltage drop across R8 nearly equal to the D.C. supply potential, and since the collector potential of TR2 is now more positive than the emitter of TR1 current is fed into the base of TR1 through the feedback path R7, D1. This feedback is positive and makes the input impedance of the level detector very high so that the output transistor (TR3) switches from its "off" to its "on" state almost instantaneously with the rise of the potential across C2 above the reference level.

The output from transistor TR3 can be utilised by any convenient protective or alarm circuit, for example, the output can furnish the gate current of a thyristor TH1 by connecting terminal X to terminal X1, or it could be utilised to energise an electromagnetic relay RL1 by connecting terminal X to terminal X2.

The pick-up level of the relay circuit can be varied either by adjustment of R1 so as to obtain the correct A.C. voltage for the pick-up current required, or by adjustment of the ratio of R4 to R5, thus changing the set level of the detector LD.

Although this invention has been described with reference to a particular form of level detector LD it is to be understood that any high-speed, high input impedance detector of this sort could alternatively be employed without departing from the scope of this invention, e.g. a Schmitt trigger.

I claim:
1. An overcurrent relay comprising:
  a full-wave rectifier circuit for developing a unidirectional voltage proportional to the magnitude of alternating current flowing through equipment protected by the relay,
  circuit means comprising both
  a voltage divider including first and second capacitors connected across the rectifier circuit, and
  a resistor connected in parallel with the first capacitor, and
  a protective circuit capable of effecting a protective function, said circuit comprising
  a first transistor having an input circuit connected across the second capacitor,
  a voltage source biassing off said transistor at a predetermined level whereby the transistor is operative only in response to the voltage developed across the said second capacitor in the voltage divider exceeding this level, and
  a protective device responsive to the operation of said transistor, the first and second capacitors being so graded as to apply instantaneously to said transistor a proportion, not exceeding one half, of the voltage developed across the rectifier circuit, and the time constant of the resistor and said first capacitor being so chosen as to match the decay time constant of current flowing through protected equipment whereby the voltage developed across said second capacitor and applied to the transistor progressively increases towards that obtaining in the steady state.

2. A relay according to claim 1, comprising:
  a second transistor operative in response to the operation of the first transistor and
  a feedback circuit connected between the second and first transistors, the feedback being effective in response to the operation of the second transistor and having a sense such as to assist the conduction of the first transistor and cause a rapid transition thereof from its "off" to its "on" state.

3. A relay according to claim 2, comprising:
  control means for varying the magnitude of the input to the rectifier circuit whereby to adjust the level at which the protective circuit will operate relative to that of the input signal applied to the relay.

4. A relay according to claim 2, comprising:
  control means for varying the said predetermined level of the bias voltage applied to the transistor, whereby to adjust the level at which the said device will operate relative to that of the input signal applied to the relay.

5. An overcurrent relay according to claim 2, wherein the proportion of said rectified voltage applied instantaneously to said device is one-half.

References Cited

UNITED STATES PATENTS

| 2,977,510 | 3/1961 | Adamson et al. | 317—36 |
| 3,211,958 | 10/1965 | Miller et al. | 317—38 X |
| 3,214,641 | 10/1965 | Sonnemann | 317—36 |
| 3,333,155 | 7/1967 | Steen | 317—36 |
| 3,334,272 | 8/1967 | Lipnitz | 317—38 X |

LEE T. HIX, Primary Examiner

W. H. BEHA, Jr., Assistant Examiner

U.S. Cl. X.R.

317—38